Patented Aug. 14, 1945

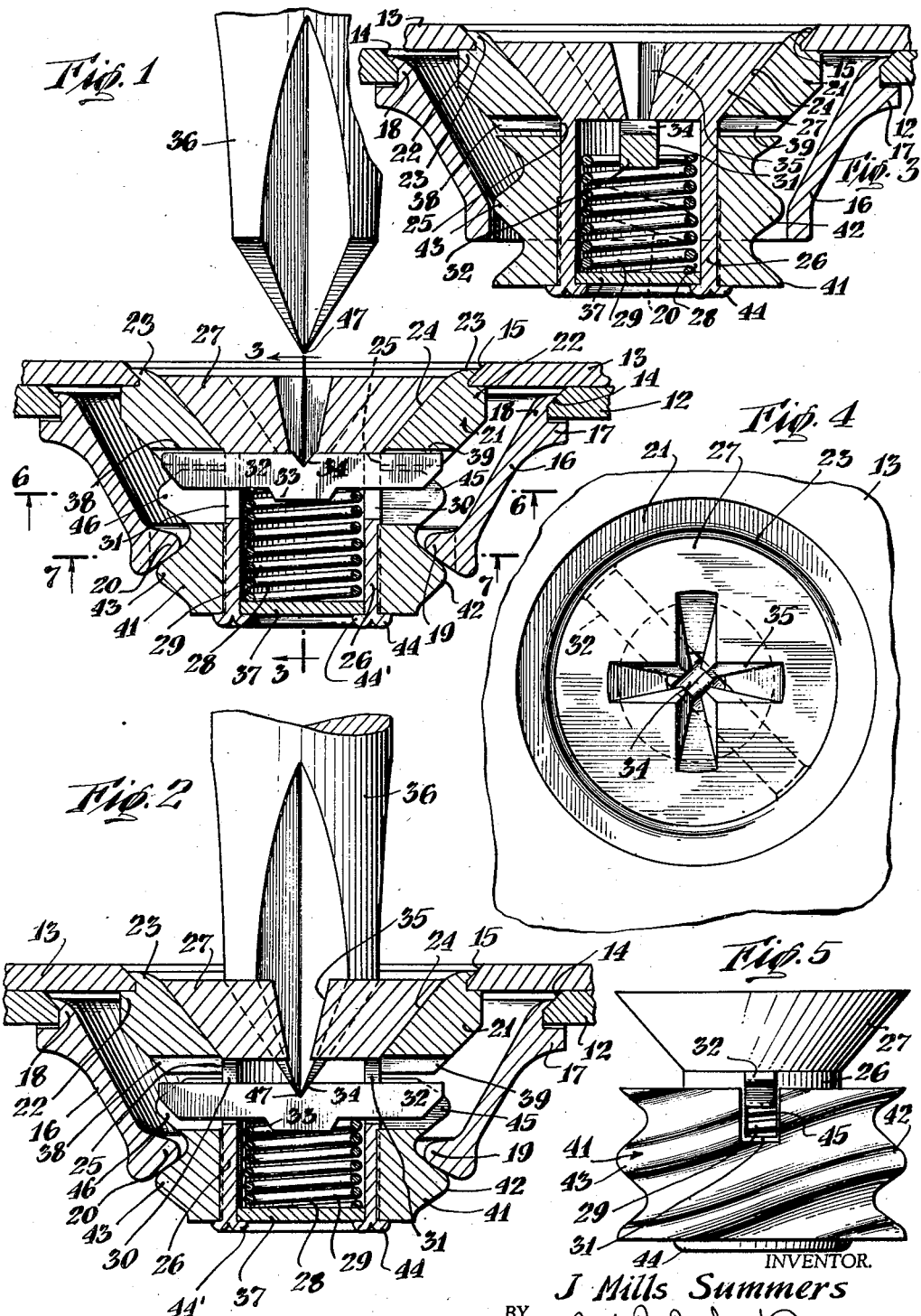

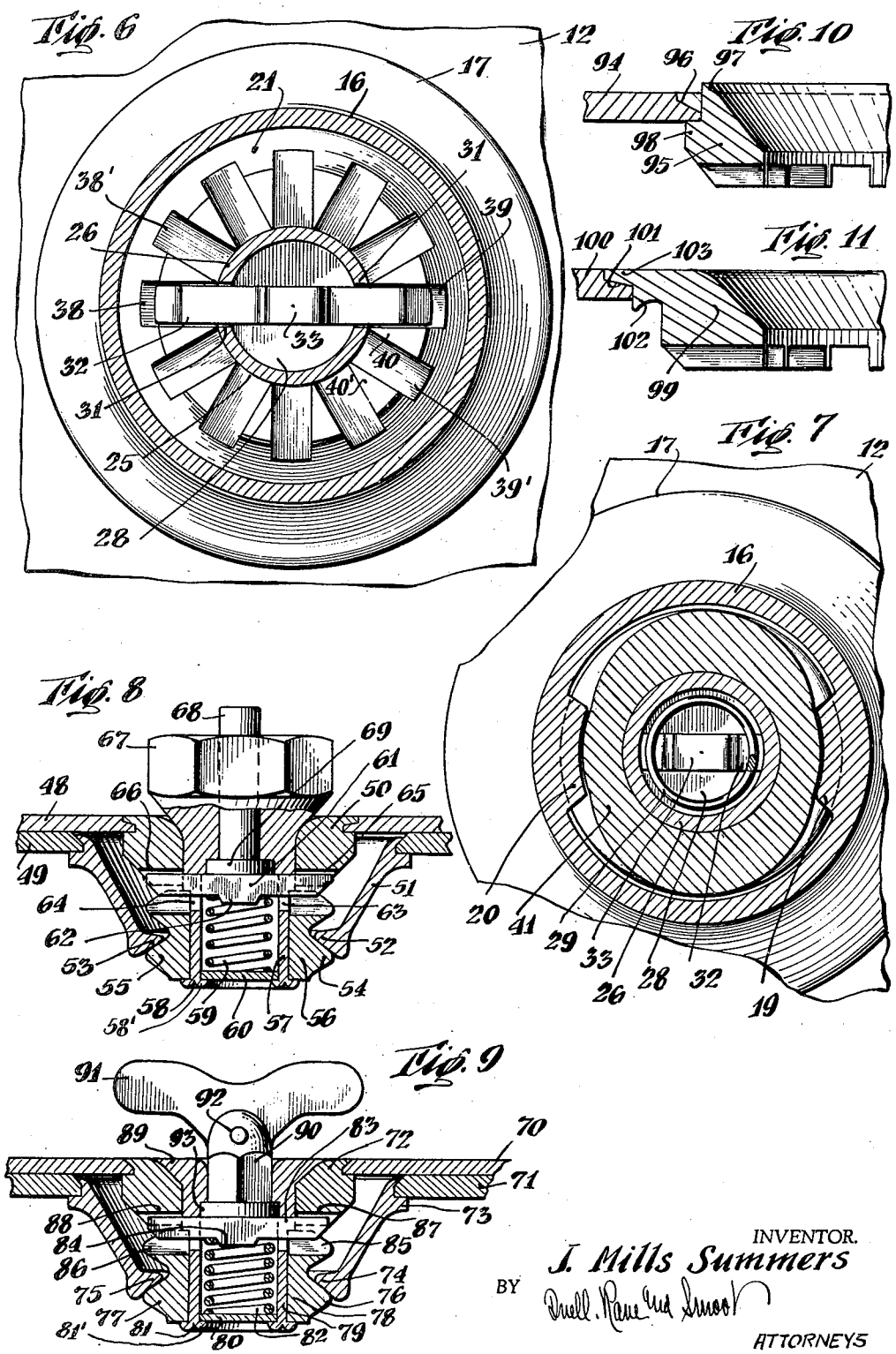

2,382,518

UNITED STATES PATENT OFFICE 2,382,518

FASTENER

J Mills Summers, Englewood, N. J., assignor, by mesne assignments, to Camloc Fastener Corporation, New York, N. Y., a corporation of New York Application November 7, 1941, Serial No. 418,127

8 Claims. (Cl. 24—221)

This invention relates to a new and improved fastening device suitable for use wherever it is desirable to draw together the members to be fastened and then retain them in such relative position by a positive lock; all operations being performed by a single normal movement.

The usual bolt and nut assembly depends upon friction to retain its clamping action. The substitution of a so-called "lock nut" only increases the friction. In neither case is there a retention by any positive and automatic lock.

Heretofore, all screw thread fastening devices employing a positive retention against unfastening have required separate and conscious operation or operations to accomplish the desired purpose. For example, the introduction of a cotter-pin through a hole in the bolt engaging the nearest castellated nut locking position has been resorted to. In this latter example, the location of the hole in the bolt and the length of the prongs on the castellated nut limit the application. The material of the cotter-pin must permit bending to retain it in position and it may be too soft for use where extreme vibration is to be met.

In certain types of application, for example on airplanes where the safety factor is of extreme importance, a positive locking function without separate conscious effort is most important and is found to be inherent in an improved fastening device of the present invention. It is desirable that access fasteners or fasteners used for instrument and accessory mounting be of the so-called "quick operating" type, i. e., they must function to fasten or unfasten with a single operation with or without operating tools, and in the locked position be retained against unfastening by a positive means not subject to vibrational loosening. The absence of such a structure has heretofore limited quick operating fasteners to devices which carry all or a portion of the working load in tension through the fastener on a spring engagement. This inherently requires clearance tolerances permitting separation of the members so fastened when the tension load is applied.

It is an object of the present invention to produce a fastener which can be used for holding several thicknesses of material together, and where once the fastener has been brought into its assembled condition, it automatically locks, making sheet separation impossible.

Another object is that of providing a fastener that will function with warped or distorted surfaces and which will draw them into contact with one another and maintain them in such contact throughout the period that the fastener remains in closed position.

Another object is that of providing a fastener of this type which is self-locking in character and when once in its fastened position, cannot be moved without first being unlocked.

A further object is that of providing a device of this type which is caused both to operate and lock by means of a single normal movement on the part of the operator.

A still further object is that of providing a fastener of the type which can be readily manufactured by automatic machinery and which will function over long periods of time with freedom from mechanical difficulties.

With these and other objects in mind, reference is had to the attached sheets of drawings illustrating practical embodiments of the invention, and in which:

Fig. 1 is a sectional side elevation of a fastener assembly in locked condition; this view also illustrating the end portion of an assembly-manipulating tool;

Fig. 2 is a view similar to Fig. 1 but showing the tool associated with the assembly and with the parts of the latter in unlocked condition;

Fig. 3 is a sectional view taken along the lines 3—3 and in the direction of the arrows as indicated in Fig. 1;

Fig. 4 is a top view of the assembled fastener shown in the preceding views;

Fig. 5 is a side elevation of the stud assembly of the fastener previously illustrated;

Figs. 6 and 7 are transverse sectional views taken along the lines 6—6 and 7—7 respectively and in the direction of the arrows as indicated in Fig. 1;

Fig. 8 is a sectional side view similar to Fig. 1 but showing an alternative form of construction;

Fig. 9 is a view again similar to Fig. 1 but showing a still further form of fastener assembly;

Fig. 10 is a fragmentary cross section of the grommet portion of a stud assembly embodying my invention; and Fig. 11 is a further side elevation in cross section of the fragment of the grommet shown in Fig. 10, but showing a modified form of assembly flange.

Referring now primarily to Figs. 1 through 7, there is shown at 12 a sheet of aluminum, duralumin or the like such as would normally be used in covering the wings and fuselage of an airplane. At 13 is shown a second sheet of similar material and such as would normally be used for a cover plate for an access area or inspection point within the fuselage or on the wing surfaces of the ship. As will be noted, both of these sheets of material have been prepared with openings 14 and 15 respectively and which preferably are countersunk at least for a portion of the distance through the sheets. In the opening in the lower sheet, there is positioned a collar member 16 formed with a shoulder 17 adjacent its upper edge and an upwardly depending flange 18 which is adapted to be turned outwardly by means of a suitable die, after the collar has been brought in position in the opening 14. Accordingly, the flange 18 grips against the countersunk portion of the opening 14, and holds the collar fixed against a movement on the lower sheet with the shoulder 17 bearing against the under surface of said sheet. The collar is also formed with inwardly extending opposed lug members 19 and 20 which are formed in the shape of segments of opposed internal screw threads on the inner surface of said collar.

Cooperating with the opening 15 in the upper sheet, is a grommet member 21 formed with a shoulder 22 adjacent its upper edge and an upwardly extending flange 23, which latter flange is turned outwardly into engagement with the countersunk portion of the opening 15 in the sheet 13. This holds the grommet fixed against movement in the sheet; the shoulder 22 bearing against the undersurface of said sheet. The grommet 21 preferably has a tapered inner surface 24 and an opening 25 below this surface and extending through the grommet. Positioned within this opening is a stud 26 which has a tapered head 27 complementary in character to the inner tapered wall 24 of the grommet 21 and in contact therewith.

The body of the stud 26 is preferably hollow as shown at 28 to accommodate the coil spring shown at 29 directly beneath the head portion 27. The stud is formed with opposed vertically extending slots 30 and 31. A cross bar 32 with an overall length substantially in excess of the diameter of the stud 26 is positioned so that it rides in the openings 30 and 31. This bar is formed with a downwardly extending central portion or knob 33 and an opposed depression 34, the latter being positioned directly beneath a central opening 35 formed in the stud head. This opening may, for example, be slotted or formed to accommodate a tool of the "Phillips" or "Reed and Prince" type or modifications thereof, the top of which is shown at 36. These types of screw slots and tools are well known in the art and may be used in substitution for the conventional slot type screw and screw driver.

The lower end of the stud 26 is preferably sealed by means of a friction fit disc member as shown at 37 which confines the coil spring 29 within the stud. As shown particularly in Fig. 6, the undersurface of the grommet 21 is provided with a plurality of opposed slot or recess portions 38 and 39 or 38' and 39' etc., which extend radially about the undersurface of the grommet and may be so spaced that the intervening walls 40, 40' etc., taper inwardly to form points as illustrated. The bar 32 is of an overall length such that it extends into and comes to rest within the slot portions 38 and 39 or 38' and 39' etc.; its size and dimensions being such that they form a relatively close fit when in said slots.

Associated with the outer surface of the stud 26 is a threaded member 41 preferably having a double thread 42 and 43 for cooperation with the lugs or thread segments 19 and 20. The lower end of the stud 26 may be flanged outwardly at 44 to hold the member 41 in position and fixed against movement on the stud. Also as shown the stud may have a second inwardly extending flange 44' to assist in positioning and retaining the disc 37. The overall length of the member 41 is such that its upper end is adjacent the lower edge of the grommet 21 and the member 41 has recesses 45 and 46 registering with the openings 30 and 31 in the stud 26 and accommodating the bar 32.

However, in utilizing the assembly of the stud and threaded member as illustrated and described, there is the added advantage of being able, by forcing the member 41 upwardly on the stud 26, to bring the former to a position of rest in contact with, or immediately adjacent the lower face of the grommet 21, thus preventing further axial movement of the stud and threaded member with respect to the grommet.

In operation, the collar member 16 is secured to the lower sheet 12 and the stud assembly and grommet 21 are connected to the upper sheet 13, both in the manner heretofore described. In this connection it will be noted that the spring 29 pressing on the undersurface of the cross bar 32 forces the latter upwardly and into position in the slots 38 and 39 on the underside of the grommet 21, thus locking the parts as the cross bar serves to hold the stud and its head 27 from relative rotation with respect to the grommet 21. The knob or extended portion 33 on the cross bar 32, tends to center the latter with respect to the coil spring 29 and prevents the cross bar from working sidewise out of the slots 30 and 31 in the stud. Upon insertion of the tool 36, into the stud head opening 35, the tip 47 of the tool engages the surfaces of depression 34 in the top of the cross bar. Inasmuch as said surfaces are complementary, a further projection of the tool 36 downwardly into the head opening causes a lowering of the cross bar 32 against compression of the spring 29, and causes this bar to ride downwardly in the slots 30 and 31 of the stud.

The parts are so proportioned that when the tool 36 is "at home" in the stud head, the cross bar 32 has been sufficiently depressed to clear the lower extremes of the grommet 21 and is entirely free of the slots 38 and 39. Thereafter, the stud 26 and its head 27 together with the threaded member 41 may be rotated at will with respect to the grommet 21. Accordingly, rotation of the stud will result in engagement of the threads 42 and 43 of the member 41 with the thread segments or lug members 19 and 20 of the collar 16, and the advancement of the threaded member 41 downwardly with respect to said collar. As the member 41 moves axially with respect to the collar 16, it carries with it the stud 26, grommet 21 and the plate or sheet 13 to which the latter is secured. Such advancement continues until the plate 13 abuts the plate 14 at which time further advancement of the threads 42 and 43 along thread segments 19 and 20 will be prevented. At that point the tool 36 is removed and the cross bar 32 thus released is projected upwardly into the slots 38 and 39 by means of the spring pressure of the coil spring 29 locking the parts in position and preventing any further relative movement. It thereafter becomes impossible to separate the fastener or the sheets 13 or 14 until once again a tool has been inserted in the stud head and the cross bar unlocked. If by chance the cross bar 32 is not aligned with the slots 38 and 39 at the time that the tool 36 is removed, it may be possible that the cross bar 32 will come to rest on the walls 40 and 40'; if this should occur any slight strain on the sheets transmitted through the threads of the fastener will rotate the parts sufficiently to cause proper alignment between the cross bar and the slots and a resultant projection of the former in the latter.

It will be observed in the construction just described, that all of the strain of both lateral and transverse character is absorbed by the fastener elements and not by the spring 29, the latter serving merely to project the bar 32 into position in the slots 38 and 39 of the grommet and maintain the same in said position. In addition, the utilization of double thread portions in the fastener design precludes the possibility of eccentric loading of the parts during longitudinal stress. In this connection, it will be noted that a single thread design might, when subjected to longitudinal stress, take the load off-center with respect to the center line of the fastener, thus inducing a bending movement from direct tension that would tend to detract from the efficiency and usefulness of the fastener. On the other hand, applicant's design spreads the load of longitudinal stress evenly over both threads, each positioned equi-distant from the center line of the fastener, and thus avoids any off-center or eccentric pull on the parts. Thus, in its locked position, the fastener becomes a unit of great rigidity and strength and its action on the sheets in bringing the same together is positive in character. As the threaded member 41 is rotated, any warpage or deformity of the sheet 13 must be overcome and the same made to conform to the contour of the sheet 14 to which it is being secured.

Turning now to Fig. 8, there are shown sheets of material 48 and 49 that are designed to be secured to one another by a fastener of the same general type described in connection with the preceding views. The grommet member is shown at 50 and the collar member at 51. The latter has opposed internal thread segments 52 and 53 which cooperate with the double thread 54 and 55 of the member 56 which in turn is secured to the stud 57 by means of the outwardly turned flange 58 as has also been described in connection with the preceding figures of the drawings. A spring 59 is positioned within the hollow center of the stud and is secured in place, for example, by means of a friction disc or plug 60 which is positioned in the bottom of the stud bore. In addition, the stud may be flanged inwardly as at 58' to further assist in holding the disc 60 in position. A cross bar 61 having a knob 62 projecting downwardly from its central portion extends laterally through the stud and beyond the opposed slots 63 and 64 formed in said stud. The cross bar cooperates with slots 65 and 66 formed in the lower face of the grommet, in the manner heretofore described in connection with the preceding views. The upper portion of the stud 57 may be, for example, formed in the shape of a hexagon member and has a plunger 68 extending through its center; the latter having a flange or head 69 at its lower edge. The flange 69 engages the upper face of the cross bar 61 and in operation a socket wrench having a design such that will cause it to engage the upper end of the plunger 68 is placed over the hexagon nut 67, and depresses the latter causing the flange 69 to bear upon the cross bar 61 and to urge the same downwardly and out of engagement with the slots 65 and 66 in the grommet 50. Thereafter, the stud assembly will be unlocked with respect to the grommet and the fastener may be rotated so that the sheets 48 and 49 may either be separated from one another or drawn together.

In Fig. 9 there is shown a further modification in which sheets 70 and 71 are both provided with openings in which the grommet member 72 and a collar 73 are respectively flanged or otherwise secured, said collar member having a double thread including segments 74 and 75 which in turn cooperate with a double thread embracing portions 76 and 77 of a member 78 carried by the stud 79 all as has been heretofore described in connection with earlier modifications. A friction fit disc 80 closes the lower end of said stud after a spring 82 has been inserted therein; the lower end of the stud 79 being flanged outwardly at 81 to hold the member 78 in position as well as inwardly at 81' to help secure the disc 80. A cross bar 83 is positioned transversely of said stud and extends through the opposed slot portions 85 and 86 to cooperate with serrations in radially extending grooves 87 and 88 of the grommet 72. Likewise, the cross bar has a downwardly depending knob 84 which centers the same with respect to the spring 82 and prevents sidewise movement with respect thereto. The upper end of the stud 79 has an outwardly flared head 89 with a square central opening in which is positioned a square shank 90 of a wing nut 91 the head of which, for example, may be secured to the shank by means of a rivet 92. The lower end of the shank 90 has a flange 93 which cooperates with the upper surface of the cross bar 83.

In operating the fastener just described, turning the wing nut 91 will not permit a relative movement of the stud 79 with respect to the grommet 72 until the wing nut has been pushed downwardly and the cross bar 83 unlocked from the slots 87 and 88 of the grommet. Under such conditions the wing nut and stud assembly will rotate together, carrying with them the member 78 and permitting a threading or unthreading of the collar and the sheet 71 from the sheet 70.

In Fig. 10 there is shown a sheet of material 94 which has been counterbored and countersunk at 96. A grommet 95 is shown in position in the opening and with an upwardly extending flange 97 adapted to be flared outwardly into position in said counterbored opening 96 for securing the parts. The shoulder 98 of the grommet 95 bears against the undersurface of the sheet and prevents displacement upwardly.

Fig. 11 shows an alternate way of securing the fastener members to the sheets. There is shown a sheet 100 which is counterbored and countersunk at 101, and a grommet 99 having a shoulder 103 conforming in contour to the counterbore 101 is postioned in said counterbored, countersunk opening. The grommet also has a downwardly depending flange 102 for outward flaring against the under-surface of the sheet 100, thus securing the parts. In certain installations it is desirable to have the greatest strength against a downward pull of the fastener part, and the type of joint shown in Fig. 11 might, under such circumstances, be preferable.

It is of course apparent that in the construction of fasteners built in accordance with the foregoing invention, numerous changes in design and rearrangements of the parts might be resorted to without in the least departing from the spirit of my invention. To the same end, any operating tools can be utilized that afford contact with the locking means during normal operation of the fastener.

I claim:

1. In a fastener of the type having a screw threaded stud in which the threads engage with a mating receptacle, a stud assembly and locking means comprising a rotatable stud member provided with a head having a manipulating slot, a mounting grommet member encircling the same and adapted to be fixedly secured to a structure, locking means carried by one of said members and locking means carried by the other of the same, whereby both of said locking means cooperate for locking said rotatable member against movement with respect to said grommet member, and actuating means positioned within said head slot and operatively connected with one of said locking means, whereby said locking means may be actuated upon manipulation of said actuating means.

2. In a fastener having a receptacle and a rotatable stud for cooperative engagement therewith, a stud assembly and locking means comprising a rotatable stud member provided with a manipulating head, said head adapted to be disposed on the upperside of a mounting structure, a mounting grommet member encircling the stud and adapted to be fixedly secured to said structure, said mounting member being formed with recesses on its lower face to be positioned on the underside of the said structure, movable locking means carried by said stud member on the underside of said structure and cooperating with said mounting member recesses for locking said rotatable member against movement with respect to said mounting member, urging means for maintaining said locking means in engagement with said mounting member recesses, and means to move said locking means from locked position coincident with engagement of said rotatable member to effect the rotation thereof and to resume its locked position upon the release of said member.

3. In a fastener having a receptacle and a rotatable stud for engagement therewith, a stud assembly and locking means comprising a rotatable stud formed with a body portion and head, a central bore in said body portion, an opening in said head communicating with said bore, opposed vertical slots in the wall of said bore, a cross bar carried by said stud body and projecting through said slots and underlying said opening, spring means disposed in said bore below said bar and urging the latter towards said head, a mounting member for said stud and adapted to be fixedly secured to a sheet of material, said member formed with bar engaging recesses in its lower face for cooperation with said resiliently positioned cross bar in locked position, whereby said bar is normally retained by said spring within said recesses but may be removed therefrom upon insertion of an operating tool within the head opening to contact said cross bar, and stud rotation thereby permitted.

4. A locking means for a fastener stud comprising a mounting grommet member for said stud, adapted to be mounted in a sheet of material, said member provided on its face to be positioned on the underside of said sheet with engaging recesses, a stud rotatably mounted within said mounting member, said stud comprising a manipulating head to be positioned on the upperside of said sheet and having a tool engaging opening and a body portion provided with a central bore, opposed vertical slots in the wall of said bore, a cross bar extending through said bore and body slots and axially movable therein, said bar adapted to engage said recesses, a resilient member disposed within said bore and acting against said bar and normally urging said bar into said recesses and means provided in said head, and acted upon by the tool used to rotate said stud to disengage said bar from said slots, thereby to permit rotation of said stud.

5. A device as in claim 2, wherein the movable locking means is a transverse cross bar axially movable on said stud.

6. A device as in claim 2, wherein the urging means for maintaining said locking means in engagement with said mounting member recesses is a coil spring in a bore provided in the rotatable stud member.

7. A device as provided in claim 2, wherein the means to move said locking means from locked position coincident with engagement of said rotatable member, is a tool receiving recess, provided in the manipulating head and communicating with and overlying the movable locking means, whereby an operating tool received in said recess engages the locking means and moves it axially against the urging means to unlocked position.

8. A device as in claim 2, wherein the means to move said locking means from locked position comprises a plunger axially slidable in a bore provided in said stud, with one end of said plunger extending into said manipulating head and the other end of said plunger contacting said locking means, whereby axial movement of said plunger is imparted to said locking means for moving said locking means against said urging means and into unlocked position, disengaged from said recesses.

J MILLS SUMMERS.